United States Patent
Lundbäck

(10) Patent No.: US 6,743,358 B1
(45) Date of Patent: Jun. 1, 2004

(54) APPARATUS FOR COLLECTING MATERIAL FLOATING ON A BODY OF WATER

(75) Inventor: Stig Lundbäck, Vaxholm (SE)

(73) Assignee: Surfcleaner AB, Vaxholm (SE)

( * ) Notice: Subject to any disclaimer, the term of this patent is extended or adjusted under 35 U.S.C. 154(b) by 44 days.

(21) Appl. No.: 10/049,958

(22) PCT Filed: Aug. 16, 2000

(86) PCT No.: PCT/SE00/01583

§ 371 (c)(1), (2), (4) Date: Feb. 19, 2002

(87) PCT Pub. No.: WO01/12905

PCT Pub. Date: Feb. 22, 2001

(30) Foreign Application Priority Data

Aug. 16, 1999 (SE) .............................. 9902914

(51) Int. Cl.[7] .......................... B01D 12/00; B01D 17/00; B01D 43/00
(52) U.S. Cl. ..................... 210/242.3; 210/540; 210/923
(58) Field of Search .............................. 210/179, 242.1, 210/242.3, 923, 538, 540, 521; 285/316

(56) References Cited

U.S. PATENT DOCUMENTS

| | | | | |
|---|---|---|---|---|
| 2,784,987 A | * | 3/1957 | Corcoran | 285/316 |
| 3,508,652 A | * | 4/1970 | Woolley | 210/242.3 |
| 3,722,688 A | * | 3/1973 | Wirsching | 210/242.3 |
| 3,853,767 A | * | 12/1974 | Mohn | 210/242.3 |
| 3,853,768 A | * | 12/1974 | Bnyhulo | 210/242.3 |
| 3,966,614 A | * | 6/1976 | Ayers | 210/242.3 |
| 4,026,581 A | * | 5/1977 | Pasbrig | 285/316 |
| 4,038,182 A | * | 7/1977 | Jenkins | 210/242.3 |
| 4,142,972 A | * | 3/1979 | Nebeker et al. | 210/242.3 |
| 4,265,758 A | * | 5/1981 | Fox | 210/242.3 |
| 4,271,017 A | * | 6/1981 | Milgram | 210/923 |
| 4,695,376 A | * | 9/1987 | Astrom et al. | 210/122 |
| 4,892,666 A | * | 1/1990 | Paulson | 210/242.3 |
| 5,073,261 A | * | 12/1991 | Conradi et al. | 210/923 |
| 5,527,461 A | * | 6/1996 | Hill | 210/540 |
| 6,015,501 A | * | 1/2000 | Lundback | 210/923 |
| 6,458,282 B1 | * | 10/2002 | Lundback | 210/923 |

FOREIGN PATENT DOCUMENTS

| | | |
|---|---|---|
| SE | 416568 B | 1/1981 |
| WO | WO 92/20572 A1 | 11/1992 |
| WO | WO 97/07292 A1 | 2/1997 |
| WO | WO 99/22078 A1 | 5/1999 |

* cited by examiner

*Primary Examiner*—Christopher Upton
(74) *Attorney, Agent, or Firm*—Browdy and Neimark

(57) ABSTRACT

A skimmer apparatus for collecting material, particularly oil, floating on the surface of a body of water, comprises collecting vessel with a collection compartment. The collection compartment includes an upper subcompartment delimited laterally by an inner wall having a skimming weir forming an inlet to the collection compartment and a lower subcompartment which is delimited laterally by an outer wall and communicates with a bottom outlet. Connected with the collection compartment is means for discharging water therefrom through the bottom outlet. The inner wall and the outer wall delimit a separation compartment for the floating material. This compartment is in open communication with the upper subcompartment of the collection compartment. A valve is provided at the top of the separation compartment and when in an open position connects the separation compartment with the upper subcompartment of the collection compartment.

16 Claims, 3 Drawing Sheets

APPARATUS FOR COLLECTING MATERIAL FLOATING ON A BODY OF WATER

This invention relates to apparatus for collecting material floating on the surface of a body of water. The apparatus according to the invention can be used for collecting different kinds of pollutants, both solid and liquid, floating on the water, but it is particularly devised and suited for collecting oil spilled on a water surface, including oil mixed with solid material. Hence, the invention will be described with particular emphasis on such use of the apparatus.

More particularly, the invention relates to a skimmer apparatus (skimmer) of the kind adapted to skim a surface layer across a skinning weir of an immersed collection vessel and allow the pollutants to accumulate on the surface of the water in the collection vessel so that they can then be removed in some suitable manner.

WO97/07292 and WO99/22078 disclose prior art embodiments of apparatus of that kind. In this kind of prior art apparatus the collection vessel has a side wall comprising an upper wall part which has some buoyancy and the upper end of which forms the skimming weir, and a lower wall part, the upper wall part being vertically movable relative to the lower wall part. The upper and lower wall parts jointly delimit laterally an upper subcompartment of a collection compartment having an inlet that is formed by the skiimming weir. A lower subcompartment of the collection compartment forms an extension of and is in open communication with the upper subcompartment. Water can be fed into and discharged from the collection vessel through an opening in a bottom wall thereof.

In the apparatus disclosed in WO97/07292 the oil is collected on the surface of the water accommodated in the upper subcompartment of the collection compartment. It is discharged from the collection compartment by feeding water from below into the collection compartment to cause the skimming weir to be pressed against an overlying plate having a discharge opening and cause the oil layer on the water surface to be expelled through the discharge opening into a suitable recipient.

In the apparatus disclosed in WO99/22078, the oil is accumulated in a separation compartment that is delimited laterally between a inner wall, which resembles the side wall of the apparatus according to WO97/07292, and an outer wall. The oil enters across the skimming weir of the inner wall and moves downward in the collection compartment delimited by the inner wall. At the lower edge of the inner wall the oil enters the separation compartment where it accumulates on the surface of the water therein. The separation compartment is delimited upward by a top wall with a discharge opening through which the oil can be expelled in the same manner as in the apparatus according to WO97/07292 by feeding water from below into the collection vessel.

An advantage of positioning the separation compartment outside the collection compartment delimited by the inner wall is that the oil flowing outward from that compartment into the separation compartment is distributed horizontally over an area that can readily be made much larger than the horizontal area delimited by the inner wall. Accordingly, the horizontal velocity of the oil in the separation compartment can be very low, thereby allowing the oil to rise substantially without disturbance to the surface in the separation compartment.

Solid objects of various kinds are often carried along by the oil and cause problems when the oil is to be discharged from the separation compartment. In the apparatus according to WO99/22078, such objects have a tendency to collect at the top of the layer of oil in the separation compartment, adjacent the top wall or roof of the collection compartment, and to remain there when the oil is expelled through the discharge opening. As a result, only those objects which are below or close to the discharge opening are carried along with the oil discharged from the separation compartment.

In the apparatus according to the invention, which is of the kind disclosed in WO99/22078 and thus has a separation compartment that is separated late-rally from the compartment into which the oil flows across the skimming weir, this problem is solved by the design of the apparatus set forth in the independent claim. Advantageous embodiments of the apparatus according to the invention have the features set forth in one or more of the independent claims.

The invention will be described in greater detail below with reference to the accompanying drawings in which an exemplary embodiment of the apparatus according to the invention is diagrammatically illustrated.

In the illustrated embodiment, the apparatus according to the invention is adapted to float in the body of water carrying the material of lower density to be collected. This material is herein supposed to be oil, possibly mixed with solid objects of one kind or another, such as bottle caps, pieces of plastic, pieces of bark and wood, or other debris. It should be noted, however, that the invention is also advantageously useful for collecting exclusively solid debris, such as leaves or other plant debris floating on the water surface in open-air pools.

The basic construction and operation of the apparatus is largely the same as in the prior art apparatus illustrated and described in WO97/07292 and WO99/22078 and will not therefore be described in detail herein.

Figure 1:
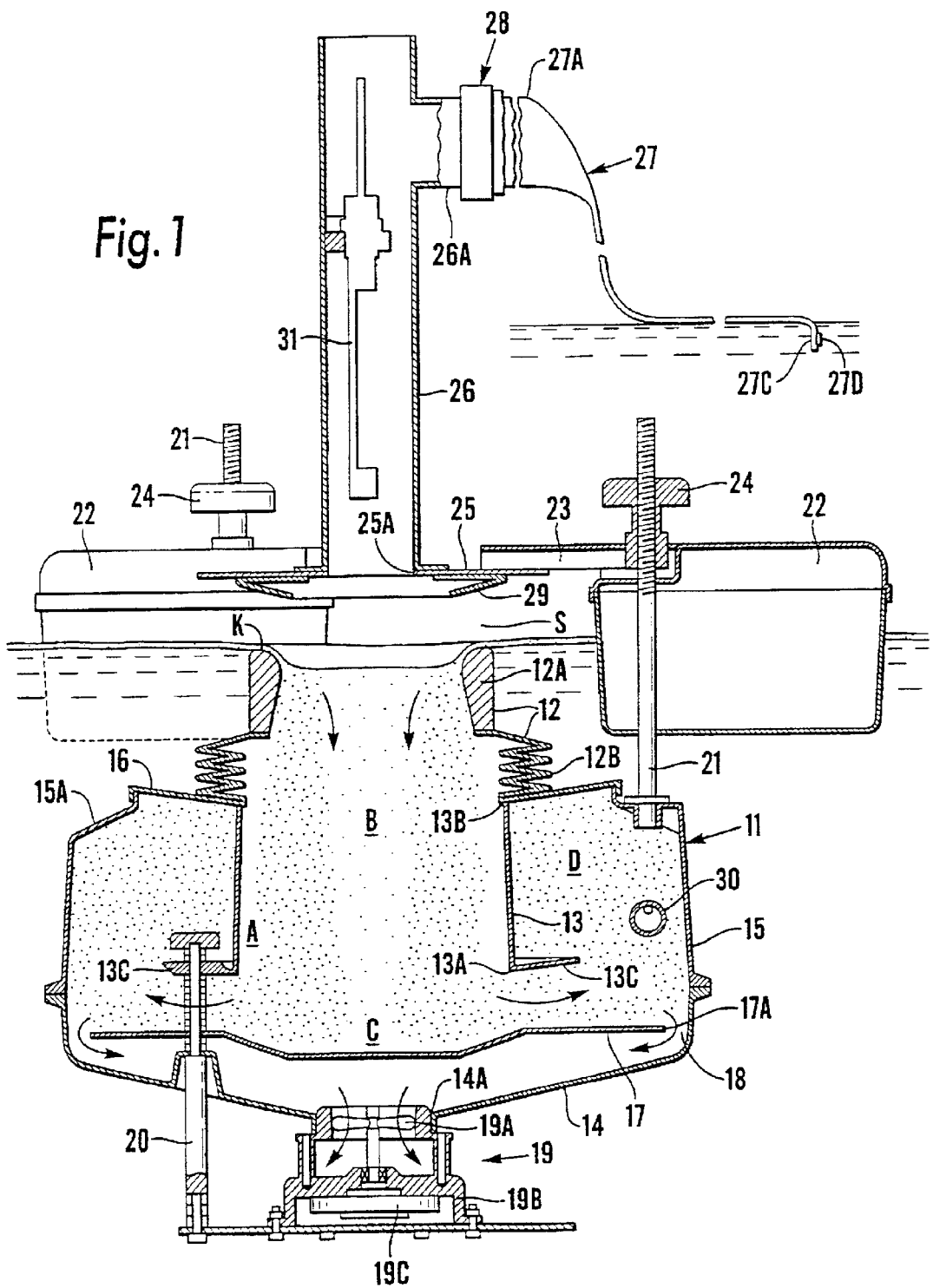
FIGS. 1 and 2 are vertical sectional views of an apparatus according to the invention showing the apparatus respectively in an operating phase in which oil is being collected and an operating phase in which oil accumulated in the apparatus and any solid objects carried along by the oil are discharged from the apparatus into a recipient.
Figure 2:
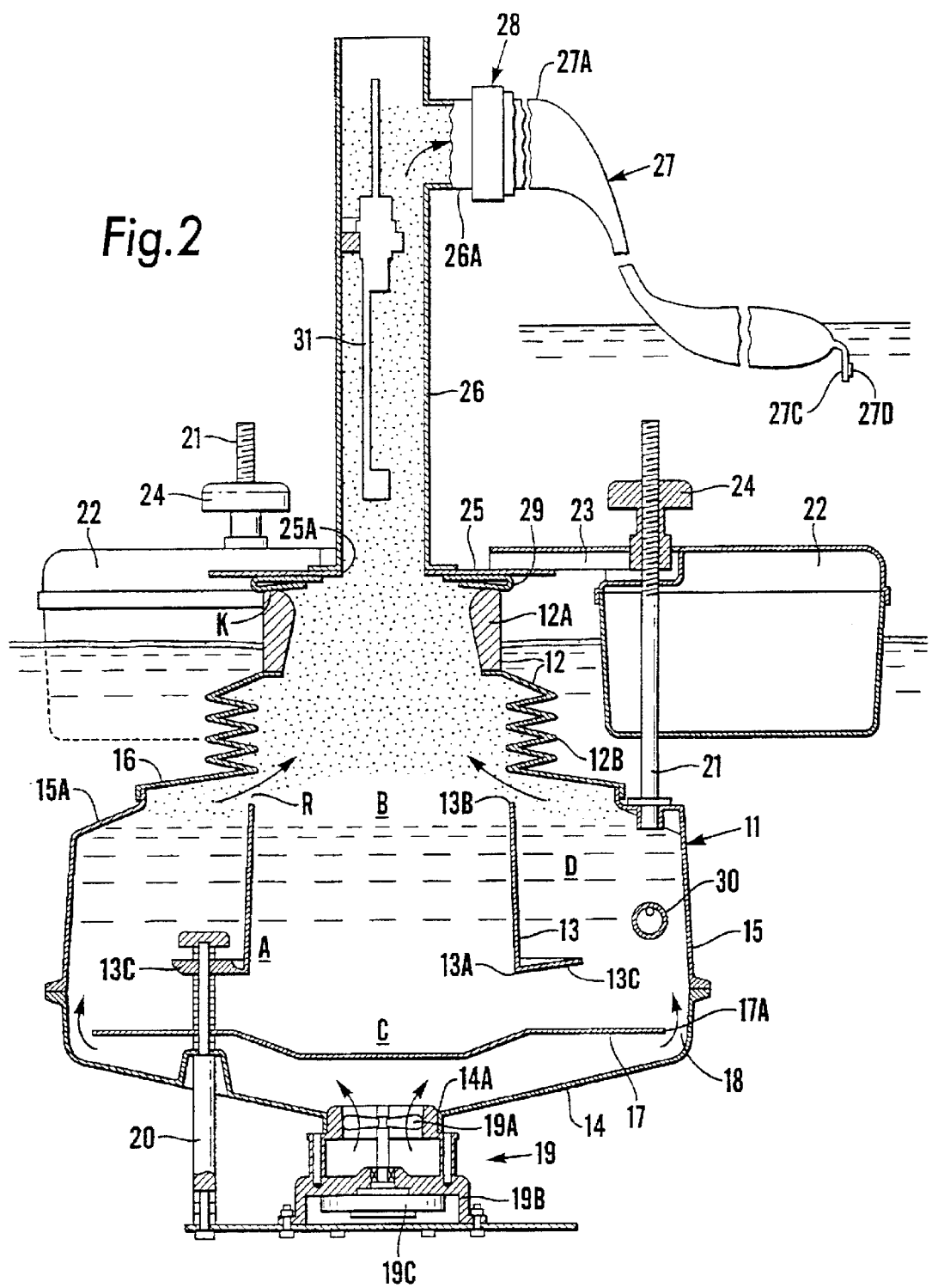

Like the prior art apparatus, the apparatus shown in FIGS. 1 and 2 comprises a submersible collection vessel, generally designated by 11, of circular cross-section. This vessel 11 forms a collection compartment, generally designated by A. At its top, the vessel has an annular, circular inlet opening formed by a skimming weir K on an annular inner wall of circular cross-section which is centrally positioned in the vessel. This inner wall comprises a vertically movable upper wall part 12 and a lower wall part 13 that is stationary with respect to the vessel. At the bottom of the vessel 11, the collection compartment A has a bottom wall 14 with a central opening 14A forming an inlet and outlet for water.

An upper subcompartment B of the collection compartment A is delimited laterally partly by the upper wall part 12 and partly by the lower wall part 13. A lower subcompartment C of the collection compartment is delimited laterally by an annular outer wall 15 the diameter of which is considerably larger than the diameter of the inner wall parts 12 and 13, in the illustrated embodiment 2–2.5 times larger.

Between the inner wall 12/13 and the outer wall 15, an annular space D is formed which is open downward and in constant open communication with the upper subcompartment B of the collection compartment A at the lower edge 13A of the lower wall part 13, and of course also with the lower subcompartment C.

At the top thereof, the space D is partly delimited by an inwardly directed flange 15A of the outer wall 15 and partly by an annular circular, slightly conical top wall member 16, the outer edge of which is secured to the flange 15A and the inner edge of which rests on the upper edge 13B of the lower wall part 13 of the inner wall. The wall member 16, which is convex as viewed from below in the illustrated condition and formed of a slightly flexible disc of polyurethane, is pivotable upward to open an annular gap S (FIG. 2) between the underside of the wall member 16 and the upper edge 13B of the wall part 13.

The annular upper wall part 12 comprises a buoyant ring 12A, the upper portion of which forms the skimming weir K, and an accordion-type bellows 12B, the upper end of which is attached to the buoyant ring and the lower end of which is attached to the wall member 16 adjacent the inner edge of the latter.

The mass of the wall part 12 is matched with its volume such that the wall part has a certain positive buoyancy in water. When the wall part 12 is immersed in a body of water and is not acted on by any forces other than the gravity force and the hydrostatic lift, its upper edge will therefore be slightly above the water surface.

Slightly spaced above the bottom wall 14 of the collection vessel 11 is a circular plate 17 the peripheral edge 17A of which is spaced inward from the outer wall part 15 to form with that wall part an annular passage 18 through which water can flow from the collection compartment A through the bottom wall opening 14A into the surrounding body of water, and naturally also in the opposite direction.

For the transport of water between the collection compartment A and the body of water around the collection vessel, a reversible pump, generally designated by 19, is provided. It comprises a pumping member 19A in the form of a propeller, which is positioned in the bottom wall opening 14A. A housing, 19B of the pump 19 accommodates an electric pump motor 19C, an electronic control unit (not shown) and a power source (also not shown) which may be one or more batteries. Alternatively, the power for the motor can be generated by solar cells. The pump 19 is removably secured to the bottom wall 14 by means of struts 20 (only one of these is shown) to which the plate 17 and an outwardly and slightly upwardly directed flange 13C of the lower wall part 13 of the inner wall are also secured.

A plurality of, e.g. three circumferentially evenly distributed vertical threaded rods 21 are secured to the flange 15A of the outer wall 15. Each of these rods supports a buoyant body 22 on a bracket 23. The height of the bracket and thus of the buoyant body 22 above the collection vessel 11 can be adjusted by means of a nut 24.

The brackets 23 jointly support a fixed horizontal plate 25 positioned directly above the inner wall 12/13. An outlet opening 25A which is concentric with the inner wall is provided in this plate, and a vertical upstanding outlet or riser tube 26 is connected to the outlet opening. The upper end of the outlet tube 26 is open to form a vent, and a laterally directed outlet spigot 26A is provided on the outlet tube at a point below the open upper end thereof. A mouth of a recipient container, which in this case is a plastic bag 27 but may also be a hose, for example, is connected to the outlet spigot by means of a connector device 28 in a manner to be described. Adjacent its free end the outlet spigot 26A is provided with an annular bead 26B. Between the annular bead and the outlet tube 26 the outlet spigot 26A carries a clamping ring 28A which is urged toward the free end of the outlet spigot by a compression spring 28B. An internally conical neck portion 28C of the clamping ring 28A is directed outwardly from the outlet tube 26.

Figure 3:
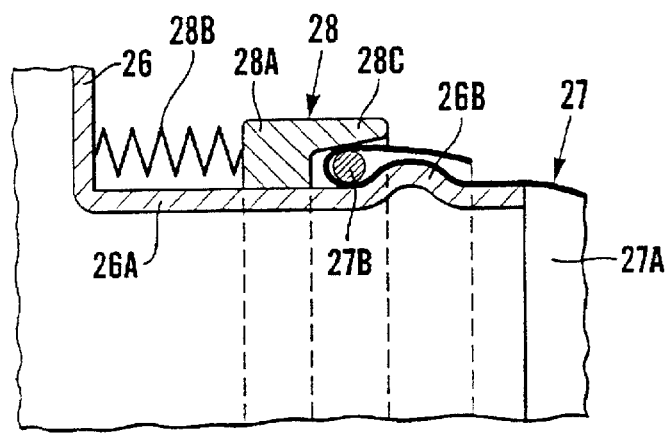
FIG. 3 is an enlarged view of a detail in FIGS. 1 and 2.
Figure 4:
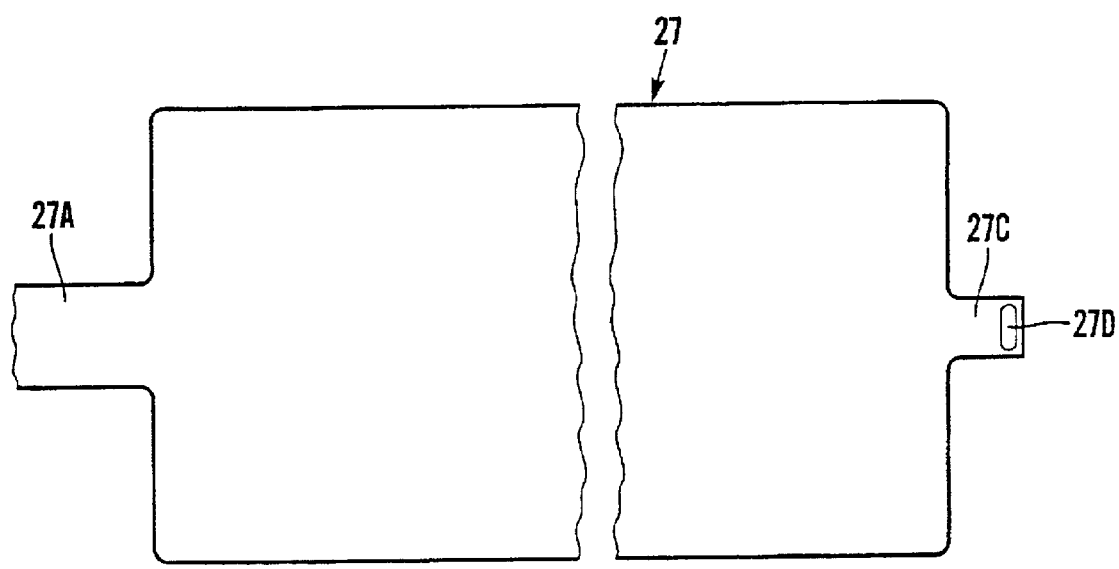
FIG. 4 is a plan view of a recipient shown in side view in FIGS. 1 and 2.

The recipient bag 27, which is made from plastic sheeting and initially flattened, is provided with a tubular mouth 27A. When the bag 27 is to be connected to the outlet spigot 26A to serve as a recipient, the clamping ring 28A is pushed toward the outlet tube 26 and the mouth 27A of the bag is pulled over the bead 26B together with a resiliently expandable neck ring 27B whereupon the end of the mouth 27A is pulled back over the neck ring 27B. When the clamping ring 28A is then released, its neck portion 28C will clamp the mouth 27A of the bag 27 securely against the neck ring 27B and the annular bead 26B, see FIG. 3.

The end of the recipient bag 27 remote from the mouth 27A is provided with a short open tubular drain 27C with a small weight 27D tending to pull the drain downward.

On the underside of the plate 25 the outlet opening 25A is surrounded by an annular lip sealing member 29, which co-operates with the upper end of the buoyant ring 12A forming the skimming weir K to seal a gap S between the plate 25 and the skimming weir K.

When the collecting apparatus is placed in a body of water, e.g. in open water or in a more restricted area, such as a pool or an area enclosed by floating booms, the collection compartment A will quickly become filled with water, and the entire apparatus will take up a height relative to the water surface such that the water surface will be slightly lower than the level of the plate 25 (see FIG. 1). In this position of the apparatus the buoyant ring 12A engages the lip sealing member 29. The flattened recipient bag 27 will float on the water with the drain 27C directed downward.

When the pump 19 then operates and pumps water out of the collection compartment A down into the body of water around the collection apparatus, the upper wall part 12 will position its skimming weir K in an overflow position relative to the water surface so that the collection compartment A will be continuously fed with water and oil and any entrained solid material. The upper wall part 12 is self-regulating with respect to the water surface in dependence on the amount of water being pumped out in relation to the inflowing amount of water. Accordingly, the upper wall part 12 always tends to maintain a balance between the inflow and the outflow.

The downward flow of water generated by the pump 19 results in a downward flow of water and oil into the central upper subcompartment B of the collection compartment A, past the horizontal lower edge 13A of the lower wall part 13 and outward toward the outer wall part 15. When the flow of water and oil enters the lower subcompartment C of the collection compartment A below the lower edge 13A, the flow will be distributed horizontally in compartment D over a horizontal cross-section that is substantially larger than the horizontal cross-section of the upper subcompartment B defined by the wall parts 12 and 13.

As a result, the horizontal flow velocity will be drastically reduced. The oil and any entrained solid material carried along by the water across the skimming weir K and, because of the relatively high flow velocity in the upper subcompartment, down into the annular compartment D beneath the wall 16 and the flange 15B will then be able by virtue of its lower density to rise into the upper part of that compartment. The oil and any entrained solid material can thus accumulate at the top of the compartment D and become separated from the water and form a layer on the water surface.

While the inflow from above into the collection compartment A and the separation of the inflowing oil in the separation compartment D is taking place in the above-described manner, the wall member 16 is pressed into sealing engagement with the upper edge 13B of the wall part 13 by the hydrostatic pressure acting on the upper side of the wall member 16. This pressure is greater than the hydrostatic pressure at the corresponding level inside the bellows 12B, because the water surface around the buoyant ring 12A is higher than the water surface inside the buoyant ring. Accordingly, together with the upper edge 13B of the wall part 13, the wall member 16 acts as a flap-like valve member to form a valve which prevents the oil accumulated on the water surface in the separation compartment D from escaping from that compartment.

After the collection has been going on for a suitable time, the electronic control unit (not shown) will reverse the pump 19 in response to a signal given by an ultrasonic sensor 30 in the separation compartment D and indicating that a sufficient amount of oil has accumulated therein, so that the pump will pump water into the collection vessel 11. As a result, the water level therein will rise and the buoyant ring 12A on the upper wall part 12 will contact the sealing element 29 on the plate 25 and seal against it so that the gap S will be tightly closed.

When that happens, the net hydrostatic pressure across the wall member 16 will be reversed so that the wall member 16 will be pivoted upward about its outer edge and open an annular outlet gap R between its underside and the upper edge 13A of the wall part 13. This is shown in FIG. 2 in which the conical shape of the wall member is reversed with respect to that shown in FIG. 1. Because of its lower density, the oil in the separation compartment D will flow upward into the upper subcompartment B of the collection compartment A and accumulate on the water surface inside the wall part 12. As shown in FIG. 2, the wall member 16 in this position is inclined inward and upward, and any solid objects accumulated in the separation compartment B and held at the underside of the wall member 16 will be carried along with the oil.

Continued pumping of water into the collection vessel 11 will cause the oil to be forced upward in the outlet or riser tube 26 by the underlying water and to exit through the overflow outlet spigot 26B into the recipient bag 27, which floats on the water around the collection apparatus. Any necessary venting of the bag takes place through the outlet spigot 26A and the open upper end of the outlet tube 26. Water carried along with the oil into the recipient bag 27 will form an underlying layer therein and can exit through the drain 27C.

In response to a new signal given by an ultrasonic sensor 31 positioned in the outlet tube 26 and indicating that substantially all oil has been discharged, the pump 19 is again reversed and the above-described operation is repeated. If the recipient bag 27 is already filled, it of course has to be replaced with a new one before the operation can be repeated. When the recipient bag 27 is detached from the outlet spigot 26A, its mouth 27A and also its drain 27C can readily be closed, e.g. by means of a plastic clip, whereupon the bag can be taken care of in any suitable manner.

As is apparent from the foregoing description, the wall member 16 serving as a flap valve member and the upper edge 13B of the wall part 13 serving as a valve seat constitute a valve that controls the opening and closing of the gap R forming an outlet from the separation compartment D in dependence on the direction of the hydrostatic pressure differential across the valve. This pressure differential changes direction in dependence on the direction of the flow produced by the pump 19. In the illustrated embodiment, the pump 19 is controlled automatically in response to the signals generated by means of the ultrasonic sensors 30 and 31, but it will be appreciated that the pump can be controlled in a different way.

In an embodiment of the apparatus according to the invention which is not shown, the upper and lower wall parts of the inner wall are cylindrical and telescopically arranged substantially like the upper and lower wall parts of the apparatus according to WO99/22078. In that embodiment, the upper wall part is designed and arranged such that it allows oil and solid material in the separation compartment to flow inward and upward into the upper subcompartment when the valve between the separation compartment and the collection compartment is open, that is, when the upper wall part is raised to its uppermost position. Other modifications that are likewise not shown are also within the scope of the invention as defined in the claims.

The illustrated system for discharging the collected material into a recipient is also useful in other apparatus in which the collected material is expelled upward and conveyed to a recipient, such as the apparatus shown in WO97/07292 and WO99/22078.

I claim:

1. Apparatus for collecting material floating on the surface of a body of water, comprising
   a collection vessel (11) with a collection compartment (A) which comprises
      an upper subcompartment (B) which is delimited laterally by an inner wall (12/13) having a skimming weir (K) forming an inlet to the collection compartment (A),
      a lower subcompartment (C) which is delimited laterally by an outer wall (15), and
      a bottom outlet (14A),
      means (19) for discharging water from the collection compartment (A) through the bottom outlet (14A),
   the inner wall (12/13) and the outer wall (15) delimiting a separation compartment (D) for the floating material, the separation compartment (D) being in open communication with a lower portion of the upper subcompartment (B) of the collection compartment (A),
   characterised by a valve (16/13B) which is provided at the top of the separation compartment (D) and when in an open position connects the separation compartment (D) with an upper portion of the upper subcompartment (B) of the collection compartment (A).

2. Apparatus according to claim 1, characterised in that the valve (16/13B) extends substantially around the upper subcompartment (B) of the collection compartment (A).

3. Apparatus according to claim 1 or 2, characterised in that the inner wall (12/13 and the outer wall 15) are annular and concentric.

4. Apparatus according to claim 3, characterised in that the valve includes an annular valve member (16) which is disposed around the upper subcompartment (B) of the collection compartment and in the closed position of the valve is in sealing engagement with an annular valve seat (13B) on the inner wall.

5. Apparatus according to claim 4, characterised in that the skimming weir (K) is formed by a buoyant body (12A).

6. Apparatus according to claim 4, characterised by an outlet (25A) which communicates with the upper subcompartment (B) of the collection compartment (A) and includes a riser tube (26) having a vent opening at its upper end and an overflow outlet (26A) at a level below the vent opening.

7. Apparatus according to claim 6, characterised by a collapsible floating recipient (27) having a mouth (27A) which is detachably connected to the overflow outlet (26A)

and a collapsible drain (27C) provided at a bottom side of the recipient remote from the mouth (27A).

8. Apparatus according to claim 7, characterised in that the overflow outlet (26a) is tubular and in that the mouth (27A) of the floating recipient (27) is tubular and slipped over the overflow outlet (26A) and clamped to it by means of a clamping ring connector (28) including an axially displaceable clamping ring (28A) surrounding the overflow outlet (26A) and an annular bead (26C) on the overflow outlet (26A).

9. Apparatus according to claim 4, characterised in that the valve (16/13B) is operable between closed and open positions by the action of a hydrostatic differential pressure across the valve.

10. Apparatus according to claim 9, characterised in that the valve (16/13B) is acted on in the closing direction by water pressure outside the inner wall (12/13).

11. Apparatus according to claim 3, characterised in that the valve seat (13B) is provided on a lower part (13) of the inner wall (12/13) and in that the lower end of an upper part (12) of the inner wall is secured to the valve member and movable together with it.

12. Apparatus according to claim 11, characterised in that the height of the upper part (12) is variable.

13. Apparatus according to claim 12, characterised in that the upper part (12) is formed over at least a portion of its height by an annular bellows (12B).

14. Apparatus according to claim 1, characterised in that the valve (16/13B) is operable between closed and open positions by the action of a hydrostatic differential pressure across the valve.

15. Apparatus for collecting oil floating on the surface of a body of water, comprising
 a collection vessel (11) with a collection compartment (A) which comprises
  an upper subcompartment (B) which is delimited laterally by an inner wall (12/13) having a skimming weir (K) forming an inlet to the collection compartment (A),
  a lower subcompartment (C) which is delimited laterally by an outer wall (15), and
  a bottom outlet (14A) through which water is capable of being discharged from the collection compartment,
 the inner wall (12/13) and the outer wall (15) delimiting a separation compartment (D) for the floating material, the separation compartment (D) being in open communication with a lower portion of the upper subcompartment (B) of the collection compartment (A), and
 a valve (16/13B) which is provided at the top of the separation compartment (D) and when in an open position connects the separation compartment (D) with an upper portion of the upper subcompartment (B) of the collection compartment (A).

16. Apparatus according to claim 15, characterised in that the valve includes an annular valve member (16) which is disposed around the upper subcompartment (B) of the collection compartment and in the closed position of the valve is in sealing engagement with an annular valve seat (13B) on the inner wall.

\* \* \* \* \*